United States Patent [19]

Razien

[11] Patent Number: 4,828,538

[45] Date of Patent: May 9, 1989

[54] DRIVE BELT ASSEMBLY

[76] Inventor: Mark Razien, P.O. Box 1353, Woodward, Okla. 73802

[21] Appl. No.: 155,855

[22] Filed: Feb. 16, 1988

[51] Int. Cl.[4] .................................................. F16G 7/00
[52] U.S. Cl. ...................................... 474/255; 474/256
[58] Field of Search ............................... 474/253–257; 24/31 B, 31 W, 31 L; 428/58; 198/844, 847

[56] References Cited

U.S. PATENT DOCUMENTS

| | | | |
|---|---|---|---|
| 3,058,680 | 10/1962 | Peterson et al. ................ | 474/254 X |
| 3,501,971 | 3/1970 | Peterson ............................ | 474/256 |
| 3,788,156 | 1/1974 | Jackson ............................. | 474/255 |
| 4,031,766 | 6/1977 | Beck ................................... | 474/254 |
| 4,254,666 | 3/1981 | Seredick ............................ | 474/253 |
| 4,376,631 | 3/1983 | Garza ................................. | 474/255 |
| 4,504,257 | 3/1985 | Cennamo .......................... | 474/256 |
| 4,637,810 | 1/1987 | Beck ................................... | 474/253 |
| 4,781,666 | 11/1988 | Acee, Sr. ........................... | 474/253 |

Primary Examiner—Jerome W. Massie
Assistant Examiner—Matthew Smith
Attorney, Agent, or Firm—Thomas W. Tolpin

[57] ABSTRACT

A variable length, drive belt assembly can be used in different vehicles and machines. The drive belt assembly is easy to install, reliable, and effective. The drive belt assembly has a slotted load bearing belt, an internal connecting strap, and special connectors for securing the belt assembly at the desired length.

4 Claims, 2 Drawing Sheets

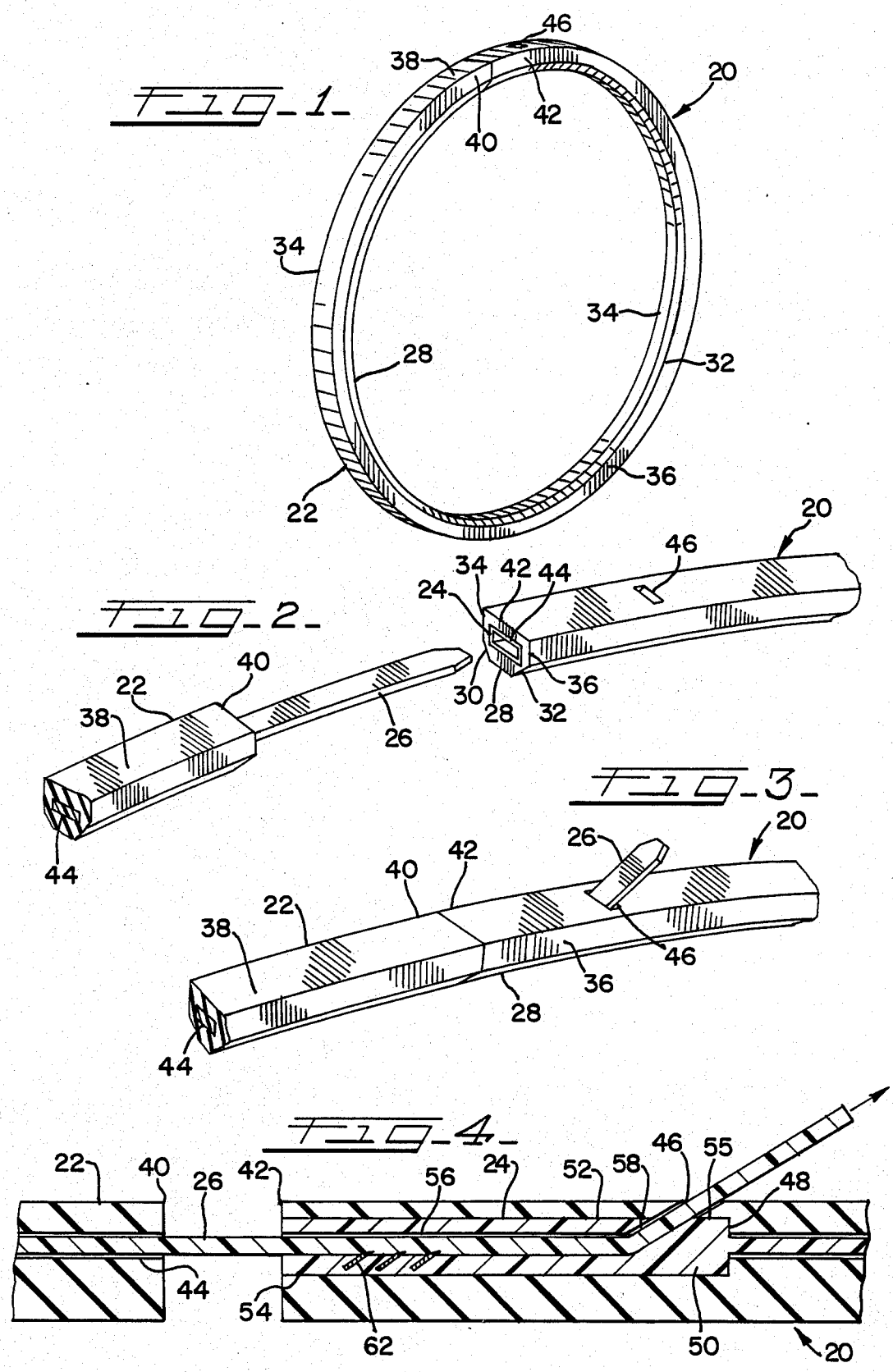

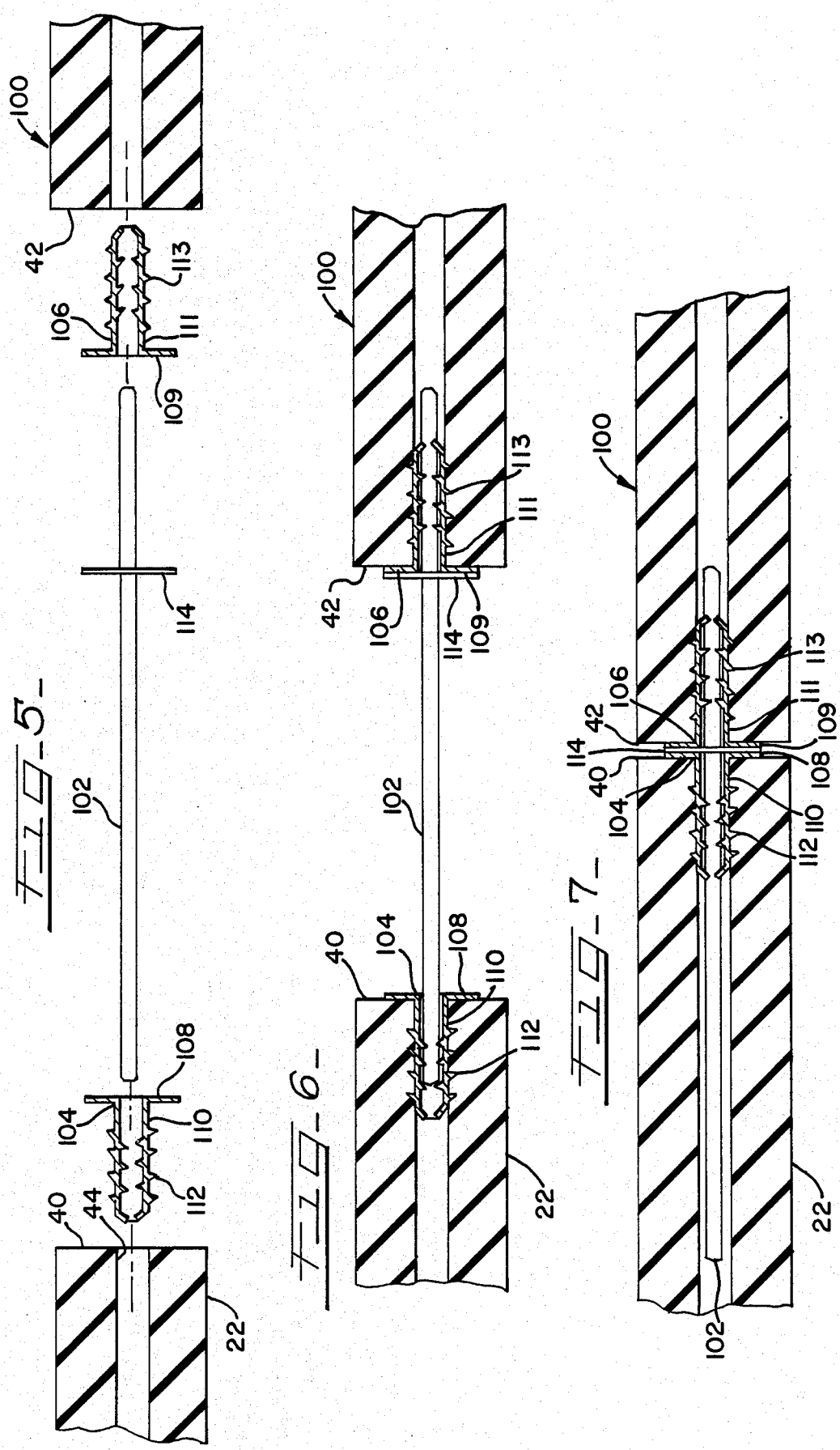

DRIVE BELT ASSEMBLY

BACKGROUND OF THE INVENTION

This invention pertains to power drive belts and, more particularly, to fan belts.

Fan belts and other power drive belts are used in vehicles such as cars, vans, and trucks, and in farm equipment, such as tractors and combines as well as in military equipment, such as tanks and all terrain vehicles. One or more belts are used in such vehicles and equipment to drive belt-driven wheels or pulleys of various mechanisms, such as alternators, generators, compressors for air conditioners, water pumps, power steering controls, power brakes, etc.

Drive belts are also used in some garage door openers and in stationary machinery, such as drill presses, band saws, power metal sheers, etc.

The size and length of fan belts and other drive belts often vary for different manufacturers, as well as for various model cars or other vehicles and equipment produced by manufacturers.

Furthermore many cars and other vehicles and equipment require more than one size belt. It is not uncommon for automobile parts suppliers to stock dozens and sometimes hundreds of different size and length fan belts.

Many gasoline and service stations, however, only carry a small amount of different size and length fan belts and then often only the most popular sizes. If a motorist becomes stranded because of belt breakage due to severe wear, or other failure, the motorist may have to wait for hours and perhaps days for a replacement belt, if the motorist does not have a duplicate spare belt or the service station does not have a suitable replacement belt in stock. This can be very inconvenient, inefficient, frustrating, and a waste of time, especially when the motorist has an important scheduled meeting, appointment, or a limited time for travel or vacation.

It is, therefore, desirable to provide a universal belt which overcomes most, if not all, of the preceding problems.

SUMMARY OF THE INVENTION

A universal variable length drive belt is provided which can be readily installed in different cars, vans, and trucks. Advantageously, the universal variable-length drive belt provides an improved, power belt assembly and fan belt which is sturdy, safe, economical, and effective. The novel interchangeable drive belt provides a high capacity load-bearing replacement belt or primary original equipment belt.

Desirably, the universal variable-length drive belt and power belt assembly can also be used in different types of farm equipment, such as tractors and combines, or in some types military equipment, such as tanks and all terrain vehicles, as well as in garage door openers and machinery, such as drill presses, band saws, power metal sheers, etc.

The novel belt can be used to power pulleys and belt-driven wheels of various equipment and mechanisms, such as alternators, generators, compressors for air conditioners, water pumps, power steering controls, power brakes, and other devices.

The universal variable-length drive belt provides an alternative to stranded motorists, passengers, farmers, construction workers, and others, who would otherwise have to wait for a towing service or search for a correct replacement belt. The universal variable-length drive belt can also reduce the costs and inventory of belts needed to be carried by gasoline service stations.

Installation of the novel belts is easy, relatively quick, and require no complex tools. Simple tools such as a pliers, scissors, shears, or other cutlers and/or simple stretcher devices make installation even easier and quicker.

To this end, the novel power belt assembly comprises a hollow belt with a central opening or slot and a connector to connect the opposite ends of the belt. The connector is positioned in the central opening or slot and preferably includes a strap with pins, locking spurs or other detents or means to substantially prevent loosening of the strap. Both the top and bottom of the belt are preferably smooth and the ends of the belt are connected to or very close to each other to form a high capacity load bearing belt which minimizes vibrations and has a stable long useful life. The belt can have generally V-shaped portions and/or flat or planar sides.

In one embodiment, the connector includes a pair of special locking clips which securely fit into the open ends of the belt. The clips can have pointed pins or fingers which securely engage the strap and prevent undesired expansion and contraction of the belt assembly after installation. The length of the strap is much smaller than the belt and only needs to extend about the end portions of the belt.

In another embodiment, the connector includes a locking assembly with a housing and a back press. The strap extends through the opening, or slot of the belt and through a hole or passageway in the housing. The strap is longer than the belt. The width (span) of the strap is smaller than the opening or slot of the belt, as well as the hole or passageway of the housing, to permit the strap to freely slide for ease of installation. Locking spurs or detents are provided as anti-reverse control devices to securely lock the strap at the desired length.

A more detailed explanation of the invention is provided in the following description and appended claims taken in conjunction with the accompanying drawings.

BRIEF DESCRIPTION OF THE DRAWINGS

FIG. 1 is a perspective view of a fan belt assembly in accordance with principles of the present invention;

FIG. 2 is an enlarged, fragmentary perspective view of the fan belt assembly prior to being fully assembled;

FIG. 3 is an enlarged, fragmentary perspective view of the fan belt assembly after the ends of the belt are connected;

FIG. 4 is a cross-sectional view of the fan belt assembly during installation;

FIG. 5 is a fragmentary assembly view of another fan belt assembly in accordance with principles of the present invention and showing portions of the belt in cross-section;

FIG. 6 is a cross-sectional view of a portion of the fan belt of FIG. 5 during installation; and FIG. 7 is a cross-sectional view of a portion of the fan belt assembly of FIG. 5 after installation.

DETAILED DESCRIPTION OF THE PREFERRED EMBODIMENTS

The composite universal, load bearing, power drive belt assembly 20 of FIGS. 1–4 comprises an elongated annular, tubular, hollow variable length drive belt 22, a strap locking assembly or device 24, and an elongated, generally flat or planar, variable length, center locking tension strap 26. The belt assembly 20 is particularly useful for driving a pulley or wheel of one or more mechanisms in an automobile. The belt assembly 20 is also useful in other vehicles, machines, and equipment.

The belt 22 can be extruded of rubber or fabricated of composite materials, such as rubber and cord. Other materials can be used. The belt has smooth exterior sides including a generally V-shaped or trapezoidal shaped engagement side 28 with inclined or flared wheel- or pulley-engaging surfaces 30 and 32, inner and outer transverse sides 34 and 36, and a lateral side or top 38. The belt 22 comprises a flexible sheath or shell with an interior and opposite open annular ends 40 and 42.

The belt 22 is movable from a generally straight storage position to a drive position comprising a substantially endless loop. The drive belt 22 has a central rectangular, elongated, strap-receiving passageway, slotted portion, opening, or slot 44 which extends along the entire length and interior circumference of the belt 22 at or slightly offset from longitudinal centerline of the belt 22. The drive belt 22 of FIGS. 2–4 also has a transverse rectangular strap-departing discharge opening, passageway, or slot 46 near one of the ends 42 which extends through the top 38 of the belt 22. The transverse strap-departing discharge opening 46 is positioned at an angle of inclination, transversely intersects, and communicates with the central elongated strap-receiving passageway 44. The transverse strap-departing discharge opening 46 provides an exit for the strap 26 and is inclined away from the closest and 42 of the belt 22. The portion of the central strap-receiving passageway 44 near the end 42 is enlarged and provides a rectangular channel, countersunk recess, or hole 48 (FIG. 4) to snugly receive and hold the locking assembly 24.

The locking assembly 24 is positioned in proximity to the interior of the belt 22 in the channel 48 (FIG. 4) adjacent one of the open ends 42 of the belt 22. The locking assembly 24 has a generally rectangular guide block 50. The guide block 50 provides a strap housing and includes an upper or outer back press 52, a lower or inner strap-engaging front plenum or main body portion 54, and a housing strap exit guide 55. The guide block 50 has a central longitudinal, rectangular strap-receiving guideway, slot, or opening 56 which is aligned and communicates with the belt's strap-receiving passageway 44. The exit guide 55 of the guide block 50 has a transverse strap-receiving discharge slot, opening or hole 58 which is aligned and communicates with the belt's transverse strap-departing discharge opening 46. The guide block's transverse, strap-departing discharge slot 58 further communicates with and intersects the guide block's strap-receiving guideway 56.

The guide block 50 can be made of impact resistant plastic. The guide block can also be made of rigid metal, hard rubber, or other materials. While the described belt assembly 22 is preferred, in some circumstances, it may be desirable to use a rounded or cylindrical locking assembly, circular holes, or passageways, and a cord, rope, wire, or cable instead of a flat strap.

In the embodiment of FIGS. 2–4, the tension strap 26 is longer than the belt 22 and extends through the strap-receiving passageway 44, guideway 56, and discharge slots 46 and 58, respectively, of the belt 22 and locking assembly 24. The strap can be made of impact-resistant plastic, such as nylon, mylar, polyethylene, or polypropylene. Leather, metal, or other materials can also be used. The strap can also be coated with tetrafluoroethylene (Teflon) or other material to enhance sliding of the strap.

The maximum span and width of the strap 26 is less than minimum span and width of the strap-receiving passageway 44, guideway 56, and discharge slots 46 and 58 of the belt 22 and locking assembly 24 to provide a clearance space therewith so as to accommodate pulling and passage of the strap through the strap-receiving passageway 44, guideway 56, and discharge slots 46 and 58. One or both edges or surfaces of the strap 26 can have indents, recesses, or V-shaped ratchet grooves or slots.

Mounted in the locking assembly 24 are detents comprising locking spurs 62 (FIG. 4). The locking spurs 62 can be pointed and made of metal. Other materials can be used. The locking spurs 62 penetrate the strap or securely engage the ratchet grooves of the strap 26 to securely wedge and locking the strap in place. The detents also provide anti-reverse control devices which substantially prevent reverse movement, slippage, and loosening of the strap 26 so that the strap 26 can only be tightened.

In use, the belt 22 and strap 26 are taken from their generally flat storage position and cut to their desired lengths. The strap 26 is inserted in and through the length of the belt's strap-receiving passageway 44 and locking assembly's guideway 56 and pulled through the discharge slots 46 and 58 and tightened. This will cause the belt 22 and strap 26 to generally form a loop such that the ends 40 and 42 of the belt 22 are in abutting engagement and snugly touch each other. The locking assembly 24 and spurs 62 cooperate with each other to securely connect and locking the strap 26 and belt 22. Any excess portions of the strap 26 which extend out of the belt's discharge slot 46 can be severed and removed.

The composite universal, load-bearing, power drive belt assembly 100 of FIGS. 5–7 is structurally and functionally similar to the belt assembly of FIGS. 1–4, except that the tension strap 102 is much shorter than the belt 22 and a pair of locking clips 104 and 106 are used instead of the locking assembly 24. The shorter tension strap 102 can be only slight longer than the open or slotted ends 40 and 42 of the belt 22 so that the strap 102 extend slightly past both end portions 40 and 42 in the drive loop position. A enlarged lock assembly-receiving channel 48 in not needed in this embodiment.

The locking clips 104 and 106 are connected to the end portions 40 and 42 of the belt 22. Each of the clips has a generally planar or flat circular transverse head 108 or 109 positioned against one of the belt's ends 40 or 42 and has a tubular cylindrical body 110 or 111 which extends longitudinally from the head 108 or 109 into the belt's strap-receiving passageway or slotted portion 44 adjacent that end portion 40 or 42. Each of clips 104 and 106 has detents comprising slanted locking pins 112 or 113 which extend inwardly from the tubular body 110 or 111 at an angle of inclination, ranging from about 15 degrees to about 75 degrees, away from the end 40 or 42 to engage the strap 102 of the V-shaped grooves or slotted portions of the strap 102. The pins 112 and 113 can be pointed and made of metal. Other materials can be used. The underside of the head can also have barbs or pointed portions to penetrate and engage the end portions 40 or 42 of the strap 102. The pins 112 and 113 securely wedge and lock the strap 102 to the belt 22. The locking clips 104 and 106 (detents) also provide anti-reverse control devices which substantially prevent reverse movement, slippage, and loosening of the strap 102 so that the strap 102 and belt 22 can only be tightened. One or more optional circular discs or spacers 114 can be placed on the strap 102 to separate the clips 104 and 106 and preselect the length of one or both ends portions 40 or 42 of the strap 102.

The belt assembly 100 of FIGS. 5-8 have similar advantages of the belt assembly 20 of FIGS. 1-4, but also have the additional advances of requiring less strap material and the absence of the guide block which makes the belt assembly 100 even more economical, easier to manufacture and fabricate, and simpler to assemble and install.

In use, the belt 22 is taken from its generally flat storage position and cut to its desired length. The clips 104 and 106 are then securely inserted into the end portions 40 and 42 of the belt 22. The strap 102 is then cut to a shorter length, if desired, although one standard length tension strap 102, such as five or six inches, can fit all belts, so that cutting of the strap 102 is not necessary. The strap 102 is then inserted into the strap-receiving passageway 44 of the end portions 40 and 42 of the belt 22 so that the strap 102 is completely within the interior of the belt 22. The end portions 44 of the belt 22 are then positioned adjacent each other so that the heads 108 and 109 of the clips 104 and 106 abut against each other or the spacer 114. This will cause the belt 22 to generally form a loop. The pins 112 and 113 of the clips 104 and 106 securely connect, anchor, and lock the strap 102 and belt 22.

In the belt assembly 100, the belt 22 has a strap-receiving passageway 44 along or slightly offset its center and is of a sufficient length to be cut to any shorter length to accomplish the desired task of the user. The belt and strap materials desirably have sufficient strength and structural integrity to turn the drive pulleys or wheels, such as those used on automotive engines. Two clips 104 and 106 are designed to be inserted into the slot 42 of the belt 22. The clips 104 and 106 anchor tightly into the belt 22 and concurrently securely grasp and hold the center locking strap 102 to prevent the strap 102 from backing out of the belt 22. The center locking strap 102 tightly joins both ends 40 and 42 of the belt 22 together and prevents the belt's ends from pulling apart and separating. The user sequentially inserts the clips 104 and 106 and then the center locking strap 102 fully into the ends 40 and 42 of the belt 22. The strap extends past the clips 104 and 106. The pins 112 and securely lock, clamp, and wedge the strap 102 against the belt 22.

Among the many advantages of the novel belt assemblies are:
1. Superior performance.
2. Provides outstanding replacement belts.
3. Can readily be used in different vehicles and machines.
4. Good market appeal.
5. Versatile.
6. Flexible.
7. Easy to use.
8. Simple to install.
9. Compact.
10. Light weight.
11. Interchangeable.
12. Economical
13. Safe.
14. Efficient.
15. Dependable.
16. Effective.

Although embodiments of the invention have been shown and described, it is to be understood that various modifications and substitutions, as well as rearrangements of parts, structural elements, and components, can be made by those skilled in the art without departing from the novel spirit and scope of this invention.

What is claimed is:

1. A power belt assembly, comprising:
   a drive belt for driving a wheel of a component of a machine selected from the group consisting of a fan, alternator, generator, compressor, water pump, power steering mechanism, power brakes, power drill press, band saw, power metal shears, pulley, garage door opener, tractor combine, tank, terrain vehicle, van, truck, and automobile, said drive belt having strap-receiving slotted end portions;
   a tension strap for positioning within said strap-receiving slotted end portions, said strap having recessed portions providing generally V-shaped recessed grooves; and
   a pair of locking clips for engaging said end portions of said belt, each of said clips having a generally planar transverse head positioned against one of said end portions of said belt and having a tubular body extending longitudinally from said transverse head into one of said end portions, said tubular body annularly surrounding and slidably receiving a portion of said strap, and each of said clips having detents comprising slanted pins extending inwardly from said tubular body at an angle of inclination away from one of said end portions to engage said V-shaped grooves of said strap.

2. A power belt assembly, comprising:
   an elongated annular tubular drive belt comprising an external outer shell having a top, a central strap-receiving passageway extending along the length of said belt and a transverse strap-departing discharge opening defining an exit along the top of said belt, said belt comprising a sheath having interior tubular, opposite open ends, and an exterior surface for engaging a wheel or pulley;
   a locking assembly positioned in proximity one of said open ends of said drive belt, said locking assembly comprising a guide block providing a housing, said guide block positioned within the interior of said tubular hollow drive belt and annularly surrounded by said drive belt, said guide block having an upper back press and a lower strap-engaging front plenum connected to said upper back press, said guide block defining a longitudinal strap-receiving guideway aligned with said strap-receiving passageway of said belt and a transverse strap-receiving discharge slot aligned with said transverse strap-receiving opening of said belt and in communication with said longitudinal strap-receiving guideway of said guide block; and
   an elongated internal locking tension strap having one end integrally connected to said guide block, said strap providing a flexible core positioned in and along said strap-receiving passageway of said belt, said strap having a maximum transverse span and width less than said strap-receiving passageway and discharge opening of said belt as well as said strap-receiving guideway and discharge slot of said locking assembly for providing clearance spacing therewith to accommodate pulling and passage of said strap through said strap-receiving-passageway and discharge opening of said belt and said strap-receiving guideway and discharge slot of said locking assembly; and said guide block being positioned between said annular drive belt and said internal strap, and said guide block having detents comprising locking spurs for interlockingly engaging and wedgably securing said strap to said guide block and for substantially preventing slippage of said strap.

3. A power belt assembly, comprising:

an elongated annular drive belt comprising a sheath having an interior, opposite open ends, and an exterior wheel-engaging surface, said belt being moveable from a generally straight storage position to a drive position comprising a generally endless loop, said belt defining central strap-receiving slotted portions near said open ends and said open ends being positioned in proximity to each other when said belt is in said drive position;

a tension strap for positioning within said strap-receiving slotted portions of said belt, said strap comprising an interior flexible core, said strap having a length substantially shorter than said belt, and said strap having a maximum transverse and span less than said strap-receiving slotted portions of said belt for providing a clearance spacing therewith to accommodate passage of said strap into said strap-receiving slotted portions of said belt;

a pair of locking clips connected to said ends of said belt, said clips having detents positioned in said strap-receiving slotted portions of said belt for interlockingly engaging and wedgably securing said strap to said belt and for substantially minimizing slippage of said strap;

said strap having recessed portions providing generally V-shaped grooves; and each of said clips having a generally planar transverse head positioned against one of said ends of said belt and a tubular body extending longitudinally from said transverse head into one of said slotted portions, and said detents comprising slanted pins extended inwardly from said tubular body at an angle of inclination away from said one of said ends to engage said V-shaped groove of said strap.

4. A power belt assembly in accordance with claim 3 wherein said angle of inclination of said slanted pins ranges form about 15 degrees to about 75 degrees.

* * * * *